United States Patent
Sommer et al.

[11] 3,971,770
[45] July 27, 1976

[54] DISULFIMIDE DISAZO DYESTUFFS

[75] Inventors: Richard Sommer, Leverkusen;
Georg Rainer, Constance; Gerhard Wolfrum, Opladen, all of Germany

[73] Assignee: Bayer Aktiengesellschaft, Leverkusen, Germany

[22] Filed: Dec. 5, 1973

[21] Appl. No.: 422,064

Related U.S. Application Data
[63] Continuation-in-part of Ser. No. 37,031, May 13, 1970, abandoned.

[30] Foreign Application Priority Data
May 17, 1969 Germany............................ 1925288

[52] U.S. Cl................................ 260/186; 260/174; 260/178; 260/184; 260/187
[51] Int. Cl.² ...................... C09B 33/02; D06P 3/24
[58] Field of Search............................ 260/186, 187

[56] References Cited
UNITED STATES PATENTS

| | | | |
|---|---|---|---|
| 2,782,185 | 2/1957 | Merian................................ | 260/186 |
| 2,891,049 | 6/1959 | Exner et al. ........................ | 260/199 |
| 3,037,014 | 5/1962 | Liechti................................ | 260/187 |
| 3,096,356 | 7/1963 | Jirou et al. ........................ | 260/205 X |
| 3,098,847 | 7/1963 | Gaetani.............................. | 260/187 |
| 3,134,766 | 5/1964 | Merian et al. ..................... | 260/186 |
| 3,169,126 | 2/1965 | Merian et al. ..................... | 260/206 |
| 3,251,822 | 5/1966 | May et al............................ | 260/187 |
| 3,254,073 | 5/1966 | Wallace et al...................... | 260/187 |
| 3,293,240 | 12/1966 | Koike et al. ........................ | 260/186 |
| 3,310,550 | 3/1967 | Liechti............................... | 260/152 |

FOREIGN PATENTS OR APPLICATIONS

| | | | |
|---|---|---|---|
| 1,115,384 | 10/1961 | Germany............................ | 260/149 |
| 426,059 | 12/1966 | Switzerland........................ | 260/186 |
| 966,826 | 8/1964 | United Kingdom................ | 260/186 |

Primary Examiner—Floyd D. Higel
Attorney, Agent, or Firm—Plumley and Tyner

[57] ABSTRACT

Disazo dyestuffs free of sulfonic acid groups of the formula

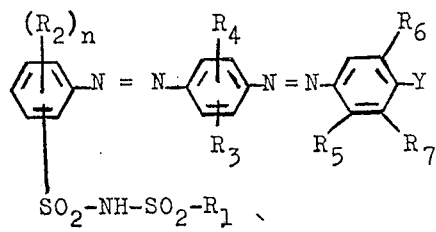

are disclosed in which $R_1$ is phenyl, alkyl phenyl or $C_1$-$C_4$-alkyl; $R_2$ is chlorine, bromine, $C_1$-$C_4$-alkyl or $C_1$-$C_4$-alkoxy; $R_3$ and $R_4$ which can be either identical or different, are hydrogen, $C_1$-$C_4$-alkyl or $C_1$-$C_4$-alkoxy; $R_5$, $R_6$ and $R_7$, which can be either identical or different, are hydrogen, $C_1$-$C_4$-alkyl, $C_1$-$C_4$-alkoxy, halogen, carboxylic amide, carboxyl, or carboxylic ester; Y is hydroxyl or $NR_8R_9$; $R_8$ and $R_9$ can be identical or different and are $C_1$-$C_4$-alkyl optionally substituted by hydroxyl or nitrile, or benzyl; and $n$ is 0, 1 or 2. The dyestuffs are used in dyeing N-containing fiber materials.

9 Claims, No Drawings

DISULFIMIDE DISAZO DYESTUFFS

This application is a continuation-in-part of Ser. No. 37,031 filed May 13, 1970, now abandoned, which application is, in entirety, incorporated herein by reference.

The invention relates to disazo dyestuffs free of sulphonic acid groups, which in the form of the free acid correspond to the general formula

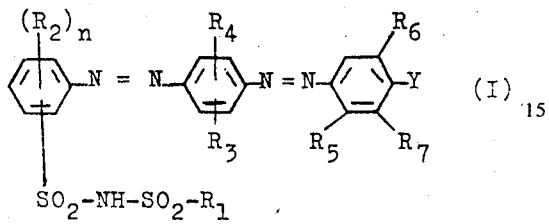

as well as processes for their manufacture and their use for dyeing nitrogen-containing fibre materials.

In general formula (I)

$R_1$ represents an aromatic residue or an aliphatic residue with 1 – 4 C atoms, $R_2$ represents chlorine, bromine, an aliphatic residue with 1 – 4 C atoms or an alkoxy group with 1 – 4 C atoms, $R_3$ and $R_4$, which can be either identical or different, represent hydrogen, an alkyl group with 1 – 4 C atoms or an alkoxy group with 1 – 4 C atoms, $R_5$, $R_6$ and $R_7$, which can be either identical or different, represent hydrogen, an alkyl group with 1 – 4 C atoms, an alkoxy group with 1 – 4 C atoms, halogen, for example fluorine, chlorine and bromine, a carboxylic amide group, a carboxyl group or a carboxylic ester group, Y represents a hydroxyl group or a residue $NR_8R_9$, wherein $R_8$ and $R_9$ can be identical or different, an alkyl group with 1 – 4 C atoms which is optionally substituted by hydroxyl or nitrile groups, or a benzyl residue, and $n$ represents the number 0, 1 or 2.

The disulphimide group of formula (I) is in the ortho-, meta- or para-position to the azo bridge.

The new disazo dyestuffs (I) are manufactured by coupling the diazonium compound from an amine of formula (II)

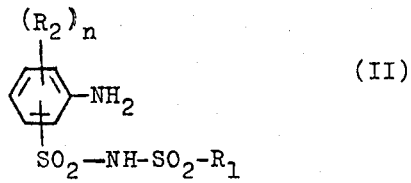

wherein $R_1$, $R_2$ and $n$ have the abovementioned significance, with an amine of general formula (III)

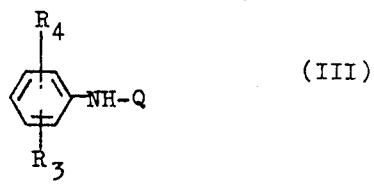

wherein $R_3$ and $R_4$ have the abovementioned significance and Q represents hydrogen or the residues —$CH_2$—$SO_3H$ or —$SO_3H$, diazotising the monoazo dyestuff thus produced, of general formula

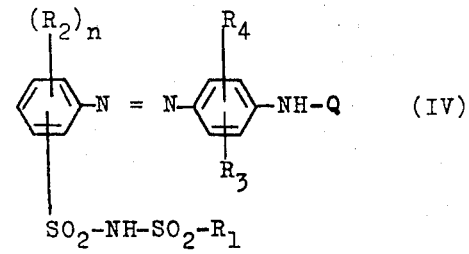

wherein $R_1$, $R_2$, $R_3$, $R_4$, Q and $n$ have the significance already indicated, after conversion of the grouping —NH—Q into a —$NH_2$ group, coupling the product with a phenol of formula

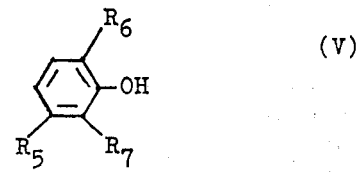

wherein $R_5$, $R_6$ and $R_7$ have the abovementioned significance, or to an aniline derivative of general formula

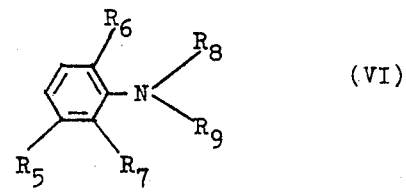

wherein $R_5$, $R_6$, $R_7$, $R_8$ and $R_9$ have the abovementioned significance.

As suitable disulphimides there may for example be mentioned: (3-amino-4-chloro-benzenesulphonyl)-benzenesulphonamide, (3-amino-4-chloro-benzenesulphonyl)-butanesulphonamide, (3-amino-4-chloro-benzenesulphonyl)-methanesulphonamide, (3-amino-4-methoxy-benzenesulphonyl)-benzenesulphonamide, (3-amino-4-methoxy-benzenesulphonyl)-methanesulphonamide, (2-amino-benzenesulphonyl)-benzenesulphonamide, (2-amino-benzenesulphonyl)-methanesulphonamide, (4-amino-benzenesulphonyl)-benzenesulphonamide, (4-amino-benzenesulphonyl)-butanesulphonamide, (3-amino-6-methyl-benzenesulphonyl)-benzenesulphonamide, (3-amino-4-butyl-benzenesulphonyl)-benzenesulphonamide, (3-amino-4-butyl-benzenesulphonyl)-methanesulphonamide, (2-amino-4-ethoxy-benzenesulphonyl)-benzenesulphonamide, (2-amino-4-bromo-benzenesulphonyl)-benzenesulphonamide, (2-amino-4-chloro-benzenesulphonyl)- methanesulphonamide, (2-amino-3-chloro-4-methyl-benzenesulphonyl)-methanesulphonamide, (2-amino-3-chloro-4-methoxy-benzenesulphonyl)-benzenesulphonamide, (3-amino-4-chloro-5-methyl-benzenesulphonyl)-benzenesulphonamide, (3-amino-5-chloro-6-methyl-benzenesulphonyl)-benzenesulphonamide, (3-amino-6-methoxy-benzenesulphonyl)-benzenesulphonamide, (3-amino-5-chloro-6-methyl-benzenesulphonyl)-methanesulphonamide, (4-amino-5-chloro-benzenesulphonyl)-benzenesulphonamide, (4-amino-3-chloro-benzenesulphonyl)-methanesulphonamide, (4-amino-5-methyl-benzenesulphonyl)-methanesulphonamide, (4-amino-5-methyl-benzenesulphonyl)-benzenesulphonamide, (3-aminobenzenesulphonyl)-benzenesulphonamide, (3-amino-benzenesulphonyl)-p-toluenesulphonamide, (3-amino-benzenesulphonyl)-methansulphonamide, (3-amino-6-methoxy-benzenesulphonyl)-p-toluene-sulphonamide, (3-amino-6-ethoxy-benzenesulphonyl)-benzenesulphonamide and (3-amino-6-ethoxy-benzenesulphonyl)-p-toluenesulphonamide.

The diazotisation of the amines (II) takes place according to methods which are in themselves known, preferably in aqueous solution containing a mineral acid and using sodium nitrite.

As suitable middle components of formula (III), the following can for example be used: aniline, o-toluidine, m-toluidine, o-anisidine, m-anisidine, 3-amino-4-methoxy-toluene, 2-amino-1,4-dimethoxy-benzene, 2-amino-1,3-dimethyl-benzene, 3-amino-1,2-dimethyl-benzene, 2-amino-1,4-dimethyl-benzene, 2-amino-isopropyl-benzene, 2-amino-1-methyl-3-ethyl-benzene, 2-amino-1,3-diethylbenzene, o-phenetidine, m-phenetidine, 2-amino-4-methoxy-toluene, 2-amino-4-ethoxy-toluene, 3-amino-4-ethoxy toluene, 2-amino-1,4-diethoxybenzene or their N-sulphonic acids or ω-methanesulphonic acids.

The coupling of the diazonium compounds of the amines of formula (II) with the amines of formula (III) takes place according to processes which are in themselves known, for example in weakly acid, aqueous solution. The monoazo dyestuffs of formula (IV) are isolated according to known methods, for example by filtration or by salting out with a salt which is soluble in aqueous solution, such as NaCl or KCl, and subsequent filtration.

The diazotisation of the monoazo dyestuffs of formula (IV) takes place according to known methods, for example in aqueous solution containing a mineral acid, or with the aid of an organic solvent, for example acetic acid, at temperatures between 0° and 30°C. The aminoazo dyestuff (IV) can however also, for example, be diazotised in concentrated $H_2SO_4$ or $H_3PO_4$ by means of nitrosylsulphuric acid.

As end components of formulae (V) and (VI) there may for example be mentioned: phenol, o-cresol, m-cresol, 2-methoxy-phenol, 2-ethoxy-phenol, 3-methoxy-phenol, 2-chlorophenol, 3-chloro-2-hydroxy-toluene, 6-chloro-2-hydroxy-toluene, 4-chloro-3-hydroxy-toluene, 2-ethyl-phenol, 3-hydroxy-1,2-dimethyl-benzene, 2-hydroxy-1,3-dimethyl-benzene, 5-hydroxy-1,3-dimethyl-benzene, 2-hydroxy-1,4-dimethyl-benzene, 2-hydroxy-1-isopropyl-benzene, 5-hydroxy-1-methyl-3-ethyl-benzene, 6-hydroxy-1,2,4-trimethylbenzene, 2-hydroxy-1-tert.butylbenzene, 2-hydroxy-1,3-diethylbenzene, 2-hydroxy-1,3-diisopropyl-benzene, salicylic acid, salicylic acid methyl ester, salicylic acid ethyl ester, salicylic acid amide, salicylic acid N,N-dimethylamide, salicylic acid N-methylamide, salicylic acid N-ethylamide, N-ethyl-N-benzyl-aniline, N-ethyl-N-benzyl-m-toluidine, N-butyl-N-benzyl-m-toluidine, N-butyl-N-aniline, N-ethyl-N-benzyl-o-toluidine, N-(2-hydroxy-ethyl)-N-benzyl-aniline, N-(2-cyanethyl)-N-benzyl-aniline, N-(2-cyanethyl)-N-benzyl-m-toluidine, N,N-bis-(2-hydroxyethyl)-aniline, N,N-bis-(2-cyanethyl)-aniline, N,N-bis-(2-hydroxyethyl)-m-toluidine, N-(3-hydroxypropyl)-N-benzyl-m-toluidine, N-(2-cyanopropyl)-N-benzyl-aniline and N-(2-cyanopropyl)-N-benzyl-m-toluidine.

The coupling of the diazotised monoazo dyestuffs (IV) with the benzene derivatives of formulae (V) or (VI) to give the diazo dyestuffs (I) also takes place in a manner which is in itself known, for example in neutral, weakly acid or alkaline solutions, but optionally also in an organic solvent, for example in acetic acid. The diazo dyestuffs of formula (I) can be isolated from the coupling mixes according to usual methods, for example by filtration. If the dyestuffs (I) arise in an impure form during the manufacture, they can be redissolved and reprecipitated from water in the usual manner, like acid dyestuffs. At times, they can also be quantitatively separated out from the aqueous solution by addition of salt.

The new dyestuffs (I) can be isolated in the form of the free acid or as alkali metal salts or ammonium salts, and/or arise in this form and/or be employed in this form for further use. Suitable alkali metal salts, in which the hydrogen atom of the —NH group is thus replaced by an alkali metal cation are the sodium, potassium, caesium and rubidium salts.

The compounds of formula (V) with Y = OH are yellow to orange-coloured dyestuffs; the dyestuffs of formula (VI) with Y = $NR_8R_9$ are red dyestuffs. Both types of compound possess a good neutral affinity and good light fastness properties.

The new dyestuffs (I) are suitable for dyeing nitrogen-containing fibre materials, such as wool and silk, but preferably polyamide fibres. Dyeing is carried out in a weakly acid or neutral bath. The good neutral affinity for polyamide fibres should be particularly highlighted. The dyestuffs of formula (I) are employed for dyeing either in the form of the free acid (>NH) or as the alkali salt or ammonium salt.

The dyestuffs (I) exhibit excellent drawing onto polyamide when applied by exhaustion from conventional aqueous dyebaths. The dyestuffs (I) also exhibit excellent differential dyeing characteristics when applied to different polyamides from the same dyebath in accordance with procedures known in the carpet dyeing art. In both, their drawing characteristics and differential dyeing characteristics on polyamide the dyestuffs (I) are markedly different and superior to the corresponding dyestuffs shown in British Patent 966,826 which contain a sulfonamide group instead of a disulfimide group.

In the examples which follow, parts denote parts by weight.

EXAMPLE 1

34.6 parts of (3-amino-4-chloro-benzenesulphonyl)-benzenesulphonamide are dissolved in 200 parts of water with the addition of 10% strength sodium hydroxide solution and treated with 7.7 parts of sodium nitrite. The solution thus obtained is allowed to run into 200 parts of ice/$H_2O$ and 35 parts of concentrated hydrochloric acid and diazotisation is carried out in one-half hour at 0° – 5°C; thereafter the excess of nitrous acid is removed by means of amidosulphonic acid and the diazonium salt suspension is allowed to run into a solution of 21 parts of anilinomethanesulphonic acid and 9 parts of sodium hydrogen carbonate in 100 parts of water at 0° – 5°C and the pH is maintained at between 6 and 8.5 by further addition of sodium hydrogen carbonate. After completion of coupling, the product is salted out with sodium chloride, filtered off and washed with saturated sodium chloride solution. The moist dyestuff paste is stirred for 1 hour in 200 parts of 7% strength sodium hydroxide solution at 80°–90°. After completion of splitting off of the sulphomethyl group the dyestuff is precipitated by adding sodium chloride, filtered off, washed with saturated sodium chloride solution and dried at 50° in vacuo. 45 parts of the monoaminoazo dyestuff thus obtained are dissolved in 500 parts of water, 7.5 parts of sodium nitrite are added and the dyestuff diazotised by pouring the mixture onto 1000 parts of water and 30 parts of concentrated hydrochloric acid at 10°–20° over the course of 30 minutes; thereafter the excess of nitrous acid is destroyed by means of amido-sulphonic acid. The diazonium salt suspension thus obtained is stirred into a solution of 9.6 parts of phenol and 4 parts of sodium hydroxide in 200 parts of water, at 10°–20°, and the pH is kept at between 8 and 9 by adding 10% strength sodium hydroxide solution. After completion of coupling, the disazo dyestuff is filtered off, washed with sodium chloride solution and dried. It dyes polyamide fibres in a yellowish-tinged orange shade from neutral or weakly acid solution. The dyeings possess good wet fastness and light fastness properties.

EXAMPLE 2

85 parts of (3-amino-4-chloro-benzenesulphonyl)-methanesulphonamide are dissolved in 700 parts of water with the addition of 10% strength sodium hydroxide solution, treated with 22 parts of sodium nitrite and diazotised by pouring into 300 parts of ice/water and 95 parts of concentrated hydrochloric acid at 0°–5°. After completion of diazotisation, an excess of nitrous acid is destroyed with amidosulphonic acid. The diazonium salt suspension is allowed to run into a solution of 44 parts of 3-amino-4-methoxy-toluene and 30 parts of concentrated hydrochloric acid in 400 parts of water at 0°–5°. The mixture is slowly neutralised by adding sodium acetate solution. After completion of coupling, the product is filtered off, washed with saturated sodium chloride solution and dried.

43 parts of the monoaminoazo dyestuff thus obtained are dissolved in 500 parts of water, mixed with 7.5 parts of sodium nitrite and diazotised in 30 minutes by pouring into 200 parts of water/ice and 30 parts of concentrated hydrochloric acid at 10° – 15°. Thereafter the excess of nitrous acid is removed by means of amidosulphonic acid. The diazonium compound thus obtained is stirred into a solution of 24 parts of N-ethyl-N-benzyl-m-toluidine in 200 parts of water and 12 parts of concentrated hydrochloric acid at 10° – 20°C and is slowly neutralised with sodium acetate. After completion of coupling, the disazo dyestuff is filtered off, washed with sodium chloride solution and dried. It dyes polyamide fibres in a ruby colour from neutral or weakly acid solution.

EXAMPLE 3

314 parts of (3-amino-benzenesulphonyl)-benzenesulphonamide are dissolved in 2000 parts of water with the addition of 70 parts of 40% strength sodium hydroxide solution, and 69 parts of sodium nitrite are then added. The solution thus obtained is added dropwise, at 0° to 3°C, to a mixture of 1000 parts of ice and 400 parts of 37% strength hydrochloric acid. After completion of the dropwise addition the mixture is stirred for a further 30 minutes, an excess of nitrous acid is removed by means of amidosulphonic acid, and the mixture is then introduced, at 0° – 5°C, into a solution of 140 parts of 3-amino-4-methoxy-toluene in 2000 parts of water and 100 parts of 37% strength hydrochloric acid. This mixture is then neutralised to pH 4 – 5 with about 300 parts of 40% strength sodium hydroxide solution. The coupling is complete after about 3 hours. The aminoazo dyestuff is filtered off and twice washed with about 3% strength hydrochloric acid. It is dissolved at pH 8 in 3000 parts of water with the addition of concentrated sodium hydroxide solution, 69 parts of sodium nitrite are added and the solution thus obtained is allowed to run into a mixture of 1000 parts of ice and 300 parts of 37% strength hydrochloric acid. Hereupon the sparingly soluble diazo compound precipitates. After removing an excess of nitrite by means of amidosulphonic acid, the suspension of the diazo compound is introduced into a solution of 110 parts of m-cresol in 2000 parts of water, 5000 parts of ice and 200 parts of 40% strength sodium hydroxide solution. The pH should finally be 9. After 4 hours the mixture is adjusted to pH 3 with hydrochloric acid and the product is filtered off, washed with sodium chloride solution and dried. 530 parts of dyestuff containing salt, of formula

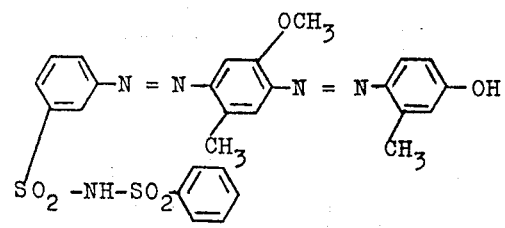

are obtained.

Using the components listed in the table below, similar dyestuffs were obtained in a corresponding manner to that described in Example 1, 2 or 3.

| Initial Component | Middle Component | End Component | Colour Shade on Polyamide |
| --- | --- | --- | --- |
| (3-Amino-4-chloro-benzene-sulphonyl)-methanesulphonamide | Aniline | 3-Methoxy-phenol | yellowish-tinged orange |
| " | " | m-Cresol | yellowish-tinged orange |
| " | " | 2-Hydroxy-1,3-dimethylbenzene | orange |
| " | " | o-Cresol | yellowish-tinged orange |
| " | " | 2-Hydroxy-1,4-dimethylbenzene | orange |
| " | " | N-Ethyl-N-benzyl-aniline | red |
| " | " | N-Ethyl-N-benzyl-m-toluidine | red claret |

-continued

| Initial Component | Middle Component | End Component | Colour Shade on Polyamide |
|---|---|---|---|
| " | 3-Amino-4-methoxy-toluene | m-Cresol | orange brown |
| " | " | 3-Methoxy-phenol | yellowish-tinged red |
| " | " | Phenol | orange |
| " | " | o-Cresol | reddish-tinged orange |
| " | " | N-Ethyl-N-benzyl-aniline | claret |
| " | " | N-Ethyl-N-benzyl-m-toluidine | bluish-tinged claret |
| " | " | N-Butyl-N-benzyl-aniline | claret |
| " | m-Toluidine | Phenol | orange |
| " | " | o-Cresol | orange |
| " | " | N-Ethyl-N-benzyl-aniline | red |
| " | " | N-Ethyl-N-benzyl-m-toluidine | red claret |
| " | m-Anisidine | N-Ethyl-N-benzyl-aniline | bluish-tinged red |
| " | " | N-Butyl-N-benzyl-aniline | bluish-tinged red |
| " | " | Phenol | yellowish-tinged orange |
| " | " | o-Cresol | yellowish-tinged orange |
| " | " | m-Cresol | yellowish-tinged orange |
| " | " | 2-Hydroxy-1,4-dimethyl-benzene | reddish-tinged orange |
| (3-Amino-4-chloro-benzene-sulphonyl)-butanesulphonamide | Aniline | Phenol | yellowish-tinged orange |
| " | " | o-Cresol | yellowish-tinged orange |
| " | " | m-Cresol | yellowish-tinged orange |
| " | " | 3-Methoxy-phenol | yellowish-tinged orange |
| " | " | 2-Methoxy-phenol | yellow brown |
| (3-Amino-4-chloro-benzene-sulphonyl)-benzenesulphonamide | " | Phenol | yellowish-tinged orange |
| " | " | 3-Methoxy-phenol | yellowish-tinged orange |
| " | " | o-Cresol | yellowish-tinged orange |
| " | " | m-Cresol | yellowish-tinged orange |
| " | " | N-Ethyl-N-benzyl-aniline | red |
| " | " | N-Ethyl-N-benzyl-m-toluidine | red claret |
| (3-Amino-benzenesulphonyl)-benzenesulphonamide | " | Phenol | yellow |
| " | " | o-Cresol | yellow |
| " | " | m-Cresol | yellow |
| " | " | N-Ethyl-N-benzyl-aniline | yellowish-tinged red |
| " | " | N-(2-Cyanethyl)-N-ethyl-aniline | yellowish-tinged red |
| " | m-Anisidine | Phenol | yellowish-tinged orange |
| " | " | o-Cresol | yellowish-tinged orange |
| " | " | N-Ethyl-N-benzyl-aniline | yellowish-tinged red |
| " | " | N-Ethyl-N-benzyl-m-toluidine | bluish-tinged red |
| " | m-toluidine | Phenol | yellow |
| " | " | m-Cresol | yellow |
| " | " | 3-Methoxy-phenol | yellowish-tinged orange |
| " | " | N-Ethyl-N-benzyl-m-toluidine | red |
| " | 3-Amino-4-methoxy-toluene | Phenol | yellowish-tinged orange |
| " | " | N-Ethyl-N-benzyl-aniline | scarlet |
| " | " | N-Ethyl-N-benzyl-m-toluidine | scarlet |
| (3-Amino-6-methoxy-benzenesulphonyl)-benzenesulphonamide | Aniline | Phenol | yellow |
| " | " | o-Cresol | yellow |
| " | " | m-Cresol | yellow |
| " | " | N-Ethyl-N-benzyl-aniline | scarlet |
| " | " | N-Ethyl-N-benzyl-m-toluidine | red |
| " | m-Toluidine | Phenol | yellow |
| " | " | o-Cresol | yellowish-tinged orange |
| " | " | m-Cresol | yellowish-tinged orange |
| " | " | N-Ethyl-N-benzyl-aniline | yellowish-tinged red |
| " | " | N-Ethyl-N-benzyl-m-toluidine | red |
| (3-Amino-6-ethoxy-benzenesulphonyl)-benzenesulphonamide | Aniline | Phenol | yellow |
| " | " | o-Cresol | yellow |
| " | " | m-Cresol | yellow |
| " | " | N-(2-Cyanethyl)-N-ethyl-aniline | scarlet |
| " | " | N,N-Bis-(-cyanethyl)-aniline | scarlet |
| " | m-Toluidine | Phenol | yellow |
| " | " | o-Cresol | yellowish-tinged orange |
| " | " | m-Cresol | yellowish-tinged orange |
| (3-Amino-benzenesulphonyl)-p-toluenesulphonamide | Aniline | Phenol | yellow |
| " | " | o-Cresol | yellow |
| " | " | m-Cresol | yellow |
| " | " | N-(2-Hydroxyethyl)-aniline | scarlet |
| " | " | N-Ethyl-N-benzyl-aniline | scarlet |
| " | m-Toluidine | Phenol | yellow |
| " | " | o-Cresol | yellow |
| " | " | m-Cresol | yellow |
| " | " | N-Ethyl-N-ben- | red |

-continued

| Initial Component | Middle Component | End Component | Colour Shade on Polyamide |
|---|---|---|---|
| " | " | zyl-m-toluidine N-(2-Cyanoethyl)-N-benzyl-aniline | yellowish-tinged red |
| " | " | N-(2-Hydroxyethyl)-N-ethyl-aniline | yellowish-tinged red |
| " | " | N,N-Bis-(2-cyanethyl)-aniline | yellowish-tinged red |

We claim:

1. Sulfonic acid-free disazo dyestuff which in the form of the free acid has the formula

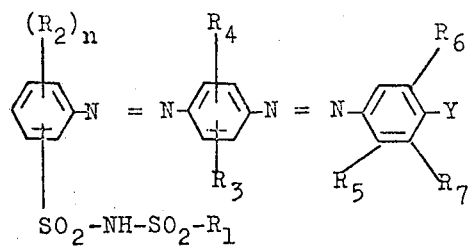

in which $R_1$ is phenyl or phenyl substituted with methyl or $C_1$-$C_4$-alkyl;

$R_2$ is chlorine, bromine, $C_1$-$C_4$-alkyl or $C_1$-$C_4$-alkoxy;

$R_3$ and $R_4$ are identical or different and are hydrogen, $C_1$-$C_4$-alkyl or $C_1$-$C_4$-alkoxy;

$R_5$, $R_6$ and $R_7$, independently of one another are hydrogen, $C_1$-$C_4$-alkyl, $C_1$-$C_4$-alkoxy, halogen, -$CONH_2$, carboxylic acid mono-$C_1$-$C_2$-alkylamide, carboxylic acid dimethylamide, carbo-$C_1$-$C_2$-alkoxy or carboxyl;

Y is hydroxyl or $NR_8$-$R_9$;

$R_8$ and $R_9$ each is $C_1$-$C_4$-alkyl;

$C_1$-$C_4$-alkyl substituted by hydroxyl or nitrile; or benzyl; and n is 0, 1 or 2.

2. The sulfonic acid-free disazo dyestuff of claim 1 in which $R_1$ is phenyl, methyl-phenyl or $C_1$-$C_4$-alkyl.

3. The sulfonic acid-free disazo dyestuff of claim 1 in which $R_1$ is phenyl.

4. The disazo dye of claim 1 having the formula

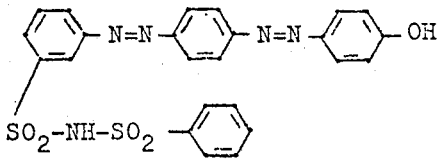

5. The disazo dye of claim 1 having the formula

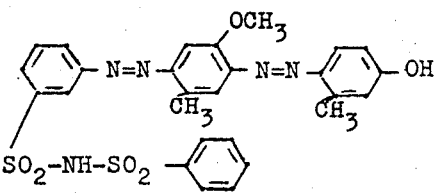

6. The disazo dye of claim 1 having the formula

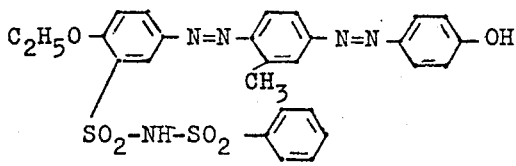

7. The disazo dye of claim 1 having the formula

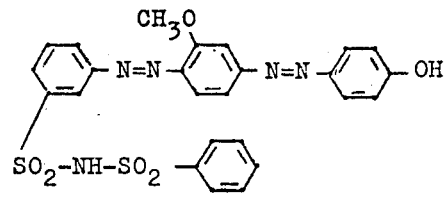

8. The disazo dye of claim 1 having the formula

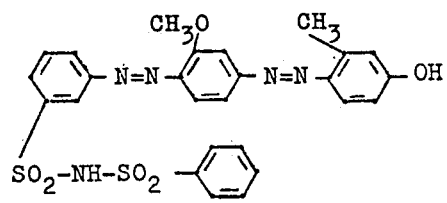

9. The disazo dye of claim 1 having the formula

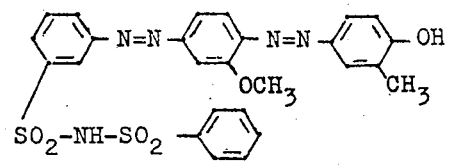

* * * * *